(12) United States Patent
Bierdel et al.

(10) Patent No.: US 8,979,355 B2
(45) Date of Patent: Mar. 17, 2015

(54) SCREW ELEMENTS WITH REDUCED SWEEP ANGLE

(75) Inventors: Michael Bierdel, Leverkusen (DE);
Thomas König, Leverkusen (DE);
Ulrich Liesenfelder, Bergisch Gladbach (DE)

(73) Assignee: Bayer Intellectual Property GmbH, Monheim (DE)

( * ) Notice: Subject to any disclaimer, the term of this patent is extended or adjusted under 35 U.S.C. 154(b) by 1006 days.

(21) Appl. No.: 12/997,626

(22) PCT Filed: Jun. 9, 2009

(86) PCT No.: PCT/EP2009/004121
§ 371 (c)(1),
(2), (4) Date: Mar. 3, 2011

(87) PCT Pub. No.: WO2009/152973
PCT Pub. Date: Dec. 23, 2009

(65) Prior Publication Data
US 2011/0141843 A1    Jun. 16, 2011

(30) Foreign Application Priority Data

Jun. 20, 2008   (DE) .................. 10 2008 029 305

(51) Int. Cl.
*B01F 15/02*     (2006.01)
*B01F 7/24*      (2006.01)
(Continued)

(52) U.S. Cl.
CPC .............. *B29B 7/481* (2013.01); *B29B 7/489* (2013.01); *B29C 47/0861* (2013.01); *B29C 47/38* (2013.01); *B29C 47/402* (2013.01); *B29C 47/6056* (2013.01); *B29C 47/62* (2013.01);
(Continued)

(58) Field of Classification Search
CPC ............ B29C 47/6043; B29C 47/6062; B29C 47/6056
USPC ................. 366/83, 84, 78, 79, 82, 85, 88, 89, 366/158.2
See application file for complete search history.

(56) References Cited

U.S. PATENT DOCUMENTS

| | | |
|---|---|---|
| 4,824,256 A | 4/1989 | Haring et al. |
| 5,487,602 A | 1/1996 | Valsamis et al. |

(Continued)

FOREIGN PATENT DOCUMENTS

| | | |
|---|---|---|
| DE | 862 668 | 1/1953 |
| EP | 0 160 124 A2 | 11/1985 |

(Continued)

OTHER PUBLICATIONS

Klemens Kohlgruber, et al., Co-Rotating Twin-Screw Extruders: Fundamentals, Technology, and Applications, Hanser Gardner Publications, Chapter 5.2, 92-94 (2007).

(Continued)

*Primary Examiner* — Tony G Soohoo
*Assistant Examiner* — Anshu Bhatia
(74) *Attorney, Agent, or Firm* — Norris McLaughlin & Marcus, P.A.

(57) ABSTRACT

The present invention relates to screw elements for multi-screw extruders with pairs of co-rotating and fully wiping screws, to the use of these screw elements in multiscrew extruders and to a method of generating screw elements according to the invention.

13 Claims, 13 Drawing Sheets

(51) Int. Cl.
  *B29B 7/48*    (2006.01)
  *B29C 47/08*   (2006.01)
  *B29C 47/38*   (2006.01)
  *B29C 47/40*   (2006.01)
  *B29C 47/60*   (2006.01)
  *B29C 47/62*   (2006.01)
  *B29C 47/00*   (2006.01)

(52) U.S. Cl.
  CPC ............ *B29B 7/483* (2013.01); *B29C 47/0844* (2013.01); *B29C 47/6075* (2013.01); *B29C 47/0009* (2013.01)
  USPC ........................................ 366/158.3; 366/83

(56) References Cited

U.S. PATENT DOCUMENTS

| | | | | |
|---|---|---|---|---|
| 5,947,593 | A * | 9/1999 | Inoue et al. | 366/85 |
| 6,783,270 | B1 * | 8/2004 | Padmanabhan | 366/82 |
| 2003/0128624 | A1 * | 7/2003 | Inoue et al. | 366/83 |

FOREIGN PATENT DOCUMENTS

| | | |
|---|---|---|
| JP | 2004262177 A | 9/2004 |
| WO | 02 09919 A2 | 2/2002 |

OTHER PUBLICATIONS

Klemens Kohlgruber, et al., Co-Rotating Twin-Screw Extruders: Fundamentals, Technology, and Applications, Hanser Gardner Publications, Chapter 5.8, pp. 103-104 (2007).

Klemens Kohlgruber, et al., Co-Rotating Twin-Screw Extruders: Fundamentals, Technology, and Applications, Hanser Gardner Publications, Chapter 12, 215-235 (2007).

Todd D. B.: "Improving Incorporation of Fillers in Plastics a Special Report", Advances in Polymer Technology, Wiley and Sons, Hoboken, NJ, US, Bd. 19, No. 1, Mar. 21, 2000, pp. 54-64, XP000954227, ISSN: 0730-6679.

Rauwendaal C: "The Geomoetry of Self-Cleaning Twin-Screws Extruders" Advances in Polymer Technology, Wiley and Sons, Hoboken, NJ, US, No. 2, Jun. 21, 1996, pp. 127-133, XP000586048, ISSN: 0730-6679.

Klemens Kohlgruber; Co-Rotating Twin-Screw Extruders; Fundamentals, Technology, and Applications; Cael Hanser Publishers; Munich; 2007.

* cited by examiner

1) R = 0.5833  Mx = 0.0000
   α = 0.0698  My = 0.0000
2) R = 0.0625  Mx = 0.5196
   α = 0.3491  My = 0.0363
3) R = 0.9167  Mx = -0.2608
   α = 0.3097  My = -0.3111
4) R = 0.0625  Mx = 0.3766
   α = 0.3810  My = 0.2576
5) R = 1.0000  Mx = -0.0407
   α = 0.3914  My = -0.5819
6) R = 0.4167  Mx = 0.0000
   α = 0.0698  My = -0.0000

1') R = 0.4167  Mx = 1.0000
    α = 0.0698  My = -0.0000
2') R = 0.9375  Mx = 1.5196
    α = 0.3491  My = 0.0363
3') R = 0.0833  Mx = 0.7392
    α = 0.3097  My = -0.3111
4') R = 0.9375  Mx = 1.3766
    α = 0.3810  My = 0.2576
5') R = 0.0000  Mx = 0.9593
    α = 0.3914  My = -0.5819
6') R = 0.5833  Mx = 1.0000
    α = 0.0698  My = -0.0000

1) R = 0.5417  Mx = 0.0000
   α = 0.0524  My = 0.0000
2) R = 0.0000  Mx = 0.5409
   α = 0.2762  My = 0.0284
3) R = 0.9167  Mx = -0.3267
   α = 0.1950  My = -0.2675

1') R = 0.4583  Mx = 1.0000
    α = 0.0524  My = -0.0000
2') R = 1.0000  Mx = 1.5409
    α = 0.2762  My = 0.0284
3') R = 0.0833  Mx = 0.6733
    α = 0.1950  My = -0.2675

| 1) R= | 0.6042 | Mx = | 0.0000 | 1') R= | 0.3958 | Mx = | 1.0000 |
| α = | 0.1396 | My = | 0.0000 | α = | 0.1396 | My = | 0.0000 |
| 2) R= | 0.0869 | Mx = | 0.5123 | 2') R= | 0.9131 | Mx = | 1.5123 |
| α = | 0.6458 | My = | 0.0720 | α = | 0.6458 | My = | 1.0720 |

| 1) R= | 0.6042 | Mx = | 0.0000 | | 1') R= | 0.3958 | Mx = | 1.0000 |
|---|---|---|---|---|---|---|---|---|
| α = | 0.1396 | My = | 0.0000 | | α = | 0.1396 | My = | 0.0000 |
| | | | | | | | | |
| 2) R= | 0.0869 | Mx = | 0.5123 | | 2') R= | 0.9131 | Mx = | 1.5123 |
| α = | 0.6458 | My = | 0.0720 | | α = | 0.6458 | My = | 1.0720 |
| | | | | | | | | |
| 3) R= | 0.3958 | Mx = | -0.072 | | 3') R= | 0.6042 | Mx = | 0.9280 |
| α = | 0.1396 | My = | -0.5123 | | α = | 0.1396 | My = | -0.5123 |
| | | | | | | | | |
| 4) R= | 0.9131 | Mx = | 0.0000 | | 4') R= | 0.0869 | Mx = | 1.0000 |
| α = | 0.1396 | My = | 0.0000 | | α = | 0.1396 | My = | 0.0000 |

SCREW ELEMENTS WITH REDUCED SWEEP ANGLE

This is an application filed under 35 USC §371 of PCT/EP2009/004121, claiming priority to DE 10 2008 029 305.9 filed on Jun. 20, 2008.

BACKGROUND OF THE INVENTION (1) Field of the Invention

The present invention relates to screw elements for multi-screw extruders with pairs of co-rotating and fully wiping screws, to the use of these screw elements in multiscrew extruders and to a method of generating these screw elements.

(2) Description of Related Art

Co-rotating twin- or multiscrew extruders whose rotors fully wipe each other have been known for a long time (see, for example, German Patent No. 862,668). Screw extruders based on the principle of fully wiping profiles have been used for many diverse applications in the field of polymer production and processing. This is mainly due to the fact that polymer melts adhere to surfaces and are degraded over time at the processing temperatures commonly employed. This is prevented by the self-cleaning effect of fully wiping screws. Rules for generating fully wiping screw profiles are described for example in Klemens Kohlgrüber: *Der gleichläufige Doppelschneckenextruder* ("*The co-rotating twin-screw extruder*"), Publishers: Hanser Verlag, Munich, 2007, pp. 96 et seq,) ("Kohlgrüber") (The abbreviations, symbols and indices written in normal script in the figures are written in italics in the description.). This reference describes the construction of one-, two- and three-flight profiles.

Those skilled in the art are aware of the fact that in the region of the screw tips a particularly large amount of energy is dissipated in the melt, thus leading to considerable local overheating in the product. This is described for example in Kohlgrüber on page 160 et seq. of Kohlgrüber. This local overheating can lead to damage to the product by, for example, producing changes in its smell, color, chemical composition or molecular weight or to the formation of inhomogeneities, such as gelled particles or specks. A large tip angle is particular damaging in this regard.

In twin-screw extruders energy is introduced in the form of highly valuable electrical energy and it is therefore desirable, for cost-related and environmental reasons, to reduce the energy input. In addition, a high input of energy leads to high product temperatures, which can in turn produce disadvantages with regard to quality. In addition, a high input of energy in many cases reduces the possible throughput and thus also the cost-effectiveness of twin-screw extruders.

The input of energy in twin-screw extruders is determined by the process parameters of throughput and speed of rotation, by the material properties of the product and by the geometry of the screws employed. Modern twin-screw extruders consist of a modular system in which various screw elements can be mounted onto a central shaft. Using such a system those skilled in the art can adapt a twin-screw extruder to suit the respective processing task. Today screw elements with two- and three-flight profiles are usually employed, since one-flight screw profiles have an excessively high energy input due to their large tip angle.

According to the prior art (see, for example, page 101 of Kohlgrüber), the geometry of fully wiping screw elements is determined by using the independent parameters of flight number Z, centre distance A and barrel diameter (i.e. which corresponds to the diameter DE of the fully wiping contour). The flight number is the number of arcs of each element which wipe the outer wall. The angle of such an arc in relation to the centre of rotation is referred to as the tip angle $KW0$. In the region of the tip angle, the outer radius of the profile is the same as the barrel radius. According to the prior art, $KW0$ is not an adjustable parameter which can be modified to suit the problem at hand, but is given by the following equation 1:

$$KW0 = \frac{\pi}{Z} - 2\arccos\left(\frac{A}{DE}\right) \qquad \text{(Eq. 1)}$$

wherein $KW0$ is the tip angle of the fully wiping profile in terms of radian measurement and $\pi$ is pi ($\pi \approx 3.14159$). The sum of the tip angles of both elements of a tightly intermeshing pair of elements $SKW0$ is therefore as follows:

$$SKW0 = 2\pi - 4Z\arccos\left(\frac{A}{DE}\right) \qquad \text{(Eq. 2)}$$

If regions of a twin-screw extruder are only partially filled with melt during operation, for example in a degassing zone or in the buffer region of a pressure build-up zone, the melt rotates downstream of the tips Kohlgrüber. Each screw profile has one flank which "pushes" the melt and one flank which "pulls" the melt. The screw rotates in such a manner that the "pushing" flank is arranged on the downstream side of the tip and the pulling flank on its upstream side. In the partially filled state the melt rotates downstream of the "pushing" flank. The dissipation of energy and processing efficiency, for example for degassing operations, in this rotating melt depends not only on the tip angle and the clearances but also on the geometry of the melt channel downstream of the "pushing" flank. The prior art does not provide any possibility of adapting this geometry to suit the problem to be solved.

During operation, the screws of multiscrew extruders are usually mounted in the gearbox at the drive end, which is at the same time the product feed end. At the product ejection end the screws are mounted in the molten product, since external mounting would be a hindrance in the product ejection zone. Before a multiscrew extruder is charged with product during a start-up process, the screws rotate without lubrication of their tips directly on the barrel material. This can lead to abrasion, damage to the screw and the barrel and contamination of the product. In order to avoid excessive wear of the tips, a certain minimum tip angle is required. It would therefore be desirable to be able to freely select this tip angle.

Twin-screw extruders can also be subject to wear, which can occur in the melting zone in the case of pure polymers. Products which are filled with solid filling and reinforcing materials such as for example talcum, calcium carbonate or in particular glass fibres, produce a particularly high degree of wear. Corrosive attack is, for example, also possible when the product contains acids or undergoes cleavage. Such abrasion and corrosive attacks have a particularly detrimental effect on the crests at the edges of a profile tip where it is, for example, possible for material to be worn away or for crumbling to occur. Such changes to the profile tip have a crucial effect on the efficiency of multiscrew extruders and this is undesirable. Rounded crests would be considerably less susceptible to such effects but cannot be used according to the prior art without losing the self-cleaning effect of the screws.

In the light of the prior art, the problem therefore arose of providing tightly intermeshing screw elements for multi-screw extruders which are not subject to the abovementioned restrictions of the screw elements according to the prior art. The problem was to provide screw elements in which the energy input is reduced. The problem was also to provide screw elements in which the geometry of the pushing and the pulling flanks can be designed in such a manner in relation to the problem to be solved that optimum processing of the product can be carried out in a multiscrew extruder.

Surprisingly, screw elements have been obtained which have a reduced tip angle compared to the prior art and which solve the abovementioned problems.

BRIEF SUMMARY OF THE INVENTION

The present invention therefore relates to screw elements for multiscrew extruders with pairs of co-rotating and fully wiping screws and two or more flights, characterized in that the sum SKW of all of the tip angles of a pair of elements can be freely selected and is greater than 0 and smaller than $$2\pi - 4Z\arccos\left(\frac{A}{DE}\right),$$

wherein Z is the number of flights, A is the centre distance between two screw elements and DE is the external diameter of the screw elements. In screw elements according to the invention the geometries of the pushing and the pulling flanks can be designed individually according to requirements and the crests at the edges of the tips can, if required, be rounded.

The invention is not restricted to screw elements with a modular design of the type commonly used today, with a screw consisting of screw elements and central shafts, but can also be used for screws constructed in one piece. Screw elements therefore also refer to screws constructed as integrated wholes.

The number of flights Z of screw elements according to the invention is preferably 2, 3, 4, 5, 6, 7 or 8; preferably it is 2 to 4.

The outer radius of a screw profile is RE=DE/2, the inner diameter is DK and the inner radius is RK=DK/2. Thus the following always applies: A=RE+RK.

The generating and generated profiles of the screw elements according to the invention (the "screw profiles") are composed of arcs which merge tangentially into each other. The generating and the generated profiles of the screw elements according to the invention each consist of at least 6*Z arcs.

The size of an arc is defined by its central angle and its radius. In the following, the "central angle of an arc" is abbreviated to the "angle of an arc". The position of an arc is defined by the position of its centre point and that of its two end points.

The profile of screw elements according to the invention is characterized in that one or more of the arcs can have a radius of zero. In this case, the profile has one or more kinks.

A predefined screw profile of a first screw of a twin-screw extruder (the "generating" screw profile) specifically determines the screw profile of an adjacent second screw (the "generated") screw profile. The screw profile of a first screw of the two-screw extruder is therefore referred to as the generating screw profile, whereas the screw profile of the adjacent second screw of the twin-screw extruder is referred to as the generated screw profile. In a multiscrew extruder, the generating screw profile and the generated screw profile are always arranged alternately.

The screw profiles according to the invention are always closed and convex. The sum of the angles of the individual arcs for each element is always $2\pi$.

Screw elements according to the invention are characterized in that each arc of the generated screw profile "corresponds" to one of the arcs of the generating screw profile. "Correspond" is understood to mean that the angles of corresponding arcs are identical in size, the sum of the radii of corresponding arcs equals the centre distance, each of the connecting lines between the centre point of an arc of the generating screw profile and its end points is parallel to one of the connecting lines between the centre point of the corresponding arc of the generated screw profile and its end points, those directions in which the end points of an arc of the generating screw profile lie in relation to the centre point of said arc are in each case opposite those directions in which the end points of the corresponding arc of the generated screw profile lie in relation to the centre point of said arc of the generated screw profile, the distance between the centre point of the arc of the generating screw profile and the centre point of the corresponding arc of the generated screw profile equals the centre distance, the connecting line between the centre point of the arc of the generating screw profile and the centre point of the corresponding arc of the generated screw profile is parallel to the connecting line between the point of rotation of the generating screw profile and the point of rotation of the generated screw profile, the direction in which the centre point of the arc of the generating screw profile would have to be shifted in order to coincide with the centre point of the corresponding arc of the generated screw profile is the same as that in which the point of rotation of the generating screw profile would have to be shifted in order to coincide with the point of rotation of the generated screw profile.

FIG. 1 depicts an example of two corresponding arcs. The centre of rotation of the generating screw is DR and the centre of rotation of the generated screw is DL. In this figure, arc 1 is the generating arc and arc 1' the generated arc.

A generating screw profile of screw elements according to the invention has Z arcs whose radii are equal to RE and whose centre points coincide with the centre of rotation (=the "tip arcs").

A generating screw profile of screw elements according to the invention has Z arcs whose radii are equal to RK and whose centre points coincide with the centre of rotation (=the "root arcs"). The corresponding generated screw profile also has Z tip arcs and Z root arcs.

The sum of the angles of the tip and root arcs of the generating screw profiles according to the invention can be freely selected and is greater than 0 and smaller than $$2\pi - 4Z\arccos\left(\frac{A}{DE}\right).$$

The sum of the angles of all of the tip arcs of the generated and the generating screw profile is equal to the sum of the tip and root angles of the generating screw profile and is, according to the invention, greater than 0 and smaller than $$2\pi - 4Z\arccos\left(\frac{A}{DE}\right).$$

In a preferred embodiment of screw elements according to the invention, the tip arcs and the root arcs are arranged in such a manner that they alternate with each other around the profile during the rotation of the screw, i.e. during rotation each tip arc is followed by a root arc and each root arc is followed by a tip arc. Thus, in the generated screw profile, the tip arcs and the root arcs are automatically arranged in such a manner that they alternate with each other around the profile during the rotation of the screw, i.e. during rotation each tip arc is followed by a root arc and each root arc is followed by a tip arc.

In a preferred embodiment of screw elements according to the invention a line "$K_1$" can be drawn for a generating screw element, which starts from the centre of rotation of the element and ends at a point on a tip arc, so that (Z−1) additional lines exist which intersect the first line at the centre of rotation of the generating screw element, where they are at an angle of $2*(i-1)*\pi/Z$ to the first line and in each case intersect an additional tip arc of the profile according to the invention, wherein i represents all numbers from 2 to Z. These lines are referred to hereinafter as $K_i$.

An additional feature of this preferred embodiment is that each line which starts at the centre of rotation and is located at an angle $(2*j-1)*\pi/Z$ to line "$K_1$" intersects a root arc, wherein j represents all numbers from 1 to Z. These lines are referred to hereinafter as $N_j$.

Two lines $K_i$ and $N_j$ are referred to as "adjacent" if the angle between these two lines is exactly $\pi/Z$. This is the case for lines $K_1$ and $N_1$, $K_2$ and $N_2$, ... and for lines $N_1$ and $K_2$, $N_2$ and $K_3$, ... up to $N_Z$ and $K_1$.

As far as the additional embodiments are concerned, the screw profile between two adjacent lines $K_i$ and $N_j$ is referred to as a "profile part". An entire screw profile can be perceived as consisting of 2*Z profile parts.

Two profile parts are referred to as "adjacent" if they are separated by a shared line $K_i$ or $N_j$.

The number of arcs in a profile part according to the invention is preferably at least four. If two adjacent arcs which directly merge into each other at one of the lines $K_i$ or $N_j$ have the same centre points and the same radii it is possible to combine these two arcs when numbering the arcs of the entire profile to form one single arc, with the result that the number of arcs can then be lower for the overall profile than the sum of the numbers of arcs for each individual profile part.

Two profile parts are referred to as corresponding if all of the component arcs of the two profile parts correspond to each other.

In a preferred embodiment of the screw elements according to the invention at least one arc of the generating screw profile which is adjacent to a tip angle is an arc with a radius of 0 (i.e. a sharp crest) and at least one arc of the generating screw profile which is adjacent to a root angle is an arc with a radius equal to the centre distance A. This automatically means that at least one arc which is adjacent to a tip arc of the generated screw profile is an arc with a radius of 0 and at least one arc which is adjacent to a root arc has a radius A=the centre distance.

In an additional preferred embodiment of the screw elements according to the invention, at least one arc of the generating screw profile which is adjacent to a tip arc is an arc with a radius of >0 and smaller than 0.1 times the screw diameter DE and at least one arc of the generating screw profile which is adjacent to a root arc is an arc with a radius of smaller than the centre distance A and greater than A−0.1*DE. This automatically means that at least one arc of the generated screw profile which is adjacent to a tip arc is an arc with a radius of >0 and smaller than 0.1 times the screw diameter DE and at least one arc which is adjacent to a root arc has a radius of smaller than A and greater than A−0.1*DE.

In a preferred embodiment, the screw profile of screw elements according to the invention is identical on the two screws—apart from possible rotation about $\pi/Z$ for an even number Z—and dot-symmetrical to the point of rotation of the profile concerned. This profile is characterized in that it consists of two types of profile parts (hereinafter referred to as "X" and "Y"). Profile part X belongs to the generating profile and profile part Y belongs to the generated screw profile. By rotating profile part X about the centre of rotation of the generating screw profile by $2\pi k/Z$, wherein k represents all integers from 1 to Z−1, the screw profile is completed in the profile sections concerned. By rotating the profile Y about the point of rotation of the generated screw profile by $2\pi k/Z$, wherein k represents all integers from 1 to Z−1, the screw profile is completed in the profile sections concerned.

In addition, the generating screw profile is completed by profile parts Y in such a manner that profile parts Y of the generated screw profile are copied onto the generating screw profile by shifting them by the centre distance in a direction from the centre of rotation of the generated screw profile to the centre of rotation of the generating screw profile and, given an even number Z, additionally by rotation about $\pi/Z$. In addition, the generated screw profile is completed by profile parts X in such a manner that profile parts X of the generating screw profile are copied onto the generated screw profile by shifting them by the centre distance in a direction from the centre of rotation of the generating screw profile to the centre of rotation of the generated screw profile and, given an even number Z, additionally by rotation about $\pi/Z$. The number of arcs of a profile section is greater than or equal to four and preferably greater than or equal to six.

In an additional preferred embodiment of screw elements according to the invention the screw profile is identical on both screw shafts, apart from possible rotation about $\pi/Z$ given an even number Z, dot-symmetrical about the point of rotation of the profile concerned and also characterized in that all lines $K_i$ and $N_j$ are lines of symmetry of the profile. In this case the profile is clearly determined by the profile part between lines $K_1$ and $N_1$ and, based on this profile part, is in each case obtained for an adjacent profile part by mirroring about the line of symmetry between the two profile parts. Line FP is introduced for defining both dot- and mirror-symmetrical screw profiles. FP is positioned at a minimum distance from the centre of rotation, which is A/2, intersects lines $K_1$ and $N_1$ and is vertical to the angle bisector between $N_1$ and $K_1$.

The profile part between lines $K_1$ and $N_1$ of this preferred embodiment of screw elements according to the invention is characterized in that the arcs of the profile part merge tangentially into each other at a point located on FP. As a result, FP is a tangent on these arcs. At the point at which the arcs touch FP, the profile part X is subdivided into two additional profile parts, X1 and X2. Profile part X1 comprises those arcs from K1 to the point of contact with FP and profile part X2 comprises those arcs from the point of contact with FP to N1. Profile part Y1 of the generated screw is that which corresponds to the arcs of X1. By mirroring about a straight line which runs vertically midway between the points of rotation of the two screw profiles and by subsequent rotation about the point of rotation of the generated profile by $\pi/Z$, profile part Y1 is copied onto profile part X2. The profile part X thereby completed can be used for generating the complete generating screw profile by continuous mirroring about lines N1, K2, N2, . . . . The screw profile of the generated screw is obtained by shifting the screw profile of the generating screw and, if Z is an even number, by rotating the screw profile about the point of rotation of the generated profile by π/Z.

Those skilled in the art are aware of the fact that fully wiping screw profiles cannot be directly incorporated in twin-screw extruders and that clearances between the screws are actually required. Many different possible strategies are described for this purpose on pages 28 et seq. of Kohlgrüber. For the screw profiles of screw elements according to the invention clearances in the range from 0.001 to 0.1, preferably in the range from 0.002 to 0.05 and particular preferably in the range from 0.004 to 0.02, based on the diameter of the screw profile, can be used. As is well-known to those skilled in the art, these clearances can be different in size or identical between the screw and the barrel and between one screw and the other. They can be constant or variable within the specified limits. It is also possible to shift a screw profile within the clearances. Possible clearance strategies include those described on page 28 et seq. of Kohlgrüber of increasing the centre distance, of longitudinal equidistant clearance or of three-dimensional equidistant clearance. All of these strategies are known to those of ordinary skill in the art. In the case of increasing the centre distance a screw profile with a smaller diameter is constructed and pulled away by the size of the clearance between the screws. In the case of the method of longitudinal equidistant clearance the profile contour of the longitudinal section (parallel to the axis) is shifted inwards towards the axis by half the clearance between the screws. In the case of the method of three-dimensional equidistant clearance, which is based on the three-dimensional curved contour along which the screw elements wipe each other as they rotate, each screw element is reduced in size in the process of its production in a vertical direction to the surface of the fully wiping profile by half of the required clearance between the screws. Preferably longitudinal equidistant clearance and three-dimensional equidistant clearance are used. Particularly preferably three-dimensional equidistant clearance is used.

The ratio RE/A of the outer radius RE of the screw element to the centre distance A is preferably between 0.54 and 0.7, and particularly preferably is between 0.58 and 0.63, for two-flight screws according to the invention, preferably between 0.53 and 0.57, and particularly preferably between 0.54 and 0.56, for three-flight screws, and preferably between 0.515 and 0.535 for four-flight screws.

The screw elements according to the invention can be designed as conveying elements or kneading elements or mixing elements.

As is known (see, for example pages 227-248 of Kohlgrüber), a conveying element is characterized by a screw profile which is continuously rotated and extends in an axial direction in the form of a screw. The conveying element can be right- or left-handed. The pitch of the conveying element, i.e. the axial length required for the complete rotation of the screw profile, is preferably in the range from 0.1 to 10 times the centre distance and the axial length of a conveying element is preferably in the range from 0.1 to 10 times the screw diameter.

As is known (see, for example pages 227-248 of Kohlgrüber), a kneading element is characterized by a screw profile which extends in an axial direction in steps in the form of kneading discs. These kneading discs can be arranged in a right-handed, left-handed or non-conveying fashion. The axial length of the kneading discs is preferably in the range from 0.05 to 10 times the centre distance. The axial distance between two adjacent kneading discs is preferably in the range from 0.002 to 0.1 times the screw diameter.

As is known (see, for example, pages 227-248 of Kohlgrüber), mixing elements are formed by designing conveying elements with openings in the screw tips. The mixing elements can be right-handed or left-handed. Their pitch is preferably in the range from 0.1 to 10 times the centre distance and the axial length of the elements is preferably in the range from 0.1 to 10 times the centre distance. The openings are preferably designed in the form of a u- or v-shaped groove and they are preferably arranged either in a backward-conveying manner or parallel to the axis. Preferably several openings are provided, which are arranged at a constant angle in relation to each other.

The present invention also relates to the use of the screw elements according to the invention in multi-screw extruders. Preferably the screw elements according to the invention are used in twin-screw extruders. The screw elements can be contained in the multi-screw extruders in the form of kneading, mixing or conveying elements. It is also possible to combine kneading, conveying and mixing elements with each other in one extruder. The screw elements according to the invention can also be combined with other screw elements which are, for example, known from the prior art.

The present invention also relates to a method of generating screw elements according to the invention. The method according to the invention allows the geometrical construction of corresponding profile parts merely by using a pair of compasses and an angle ruler and it is therefore simple to carry out. Advantageously it is executed by means of a computer program.

First of all the defining parameters Z, DE and A of the screw elements to be constructed are fixed. Then the points of rotation of the generating and the generated profile part are inserted at a distance A from each other. Line $K_1$, which leads towards a point on the tip arc, is appropriately selected so that it starts from the point of rotation of the generating profile and proceeds in the direction of the point of rotation of the generated profile.

Line $N_1$ is drawn from the point of rotation of the generating profile part at an angle of π/Z to line $K_1$. Parameters RE=DE/2 and RK=A−RE are calculated. Then the number of arcs n of the profile part is determined The number of arcs n is preferably 6, but can be smaller or larger.

Then the tip angle α is selected and an arc with an angle between 0 and α, preferably α/2, and a radius RE is formed, whose centre point is the centre point of the generating screw, one end of the arc being located on line $K_1$ and the arc being formed in the direction of $N_1$. The angle selected for the root angle is angle β, which can, but must not necessarily, be the same as α. For this purpose, an arc β/2, which represents the root arc, is formed from line $N_1$ in the direction of $K_1$.

Then the tangential arc 2 is drawn which follows on from the tip arc. The angle and the radius of this arc can be freely selected, although it is necessary for the radius of the arc to be smaller than or equal to the centre distance. When choosing the angle and the radius it may perhaps be no longer possible to close the profile part in subsequent steps since the requirements of a "closed profile" or a "convex profile" are not met. If this is the case, the angle or the radius must be reduced in size and a new attempt must be made. The arc can also have a radius of 0.

In order to construct a tangential arc, a perpendicular is always drawn from the end point of an already existing arc in the direction of the centre point of this existing arc of the generating screw profile. This perpendicular is referred to as the "boundary line" between two arcs. Each boundary line is allocated a direction which starts from the centre point of the arc and leads to the end point of the arc concerned. The centre points of both tangential arcs are always located on this boundary line. The centre point of the required arc is obtained by drawing a circle about the end point of the existing arc with a radius corresponding to that of the required arc. The intersecting point between this circle and the boundary line is the required centre point.

An arc with a radius of 0 is treated in the same way as an arc with a very small radius eps, which tends towards 0, so that the tangential transition can continue to be constructed. Alternatively an arc with a radius of 0 can be treated in such a manner that the screw profile has a kink at the position of this arc, the size of the kink being determined by the angle of this arc.

Then one or more additional tangential arcs 3, 4, . . . to n−4 can be formed. The radii r(n−3, r(n−2) and r(n−1) are fixed for arcs n−3, n−2 and n−1. The radius of arc n−1 is selected to be A, if the generated screw profile is required to have a sharp crest at its tip.

The profile is then closed in the following manner: A circle with a radius of r(n−3)-r(n−2) is drawn around the centre point of arc n−3. A circle with a radius of r(n−1)-r(n−2) is drawn around the centre point of arc n−1. Of the two points of intersection between these circles, the one located between N1 and K1 in their respective direction is the centre point of circle n−2. The boundary line of arc n−1 is then obtained by connecting the centre point of arc n−1 to the centre point of arc n−2, and the boundary line of arc n−3 and n−2 is obtained analogously. Arcs n−3, n−2 and n−1 are then drawn with the corresponding boundary lines between them.

The corresponding profile part of the generated screw is generated as follows: All the centre points of arcs M1 and M2 to Mn are shifted by the centre distance in the direction of the generated profile parallel to a line between the point of rotation of the generating profile and the point of rotation of the generated profile, thus producing corresponding points M1' and M2' to Mn'. The boundary lines which intersect points M1 to Mn are initially also shifted by the centre distance in the direction of the generated profile parallel to a line between the point of rotation of the generating profile and the point of rotation of the generated profile. These shifted boundary lines intersect each other at the corresponding points M1' and M2' to Mn'. If they are each extended in an opposite direction through the respective points M1' and M2' to Mn' and a corresponding radius r1', r2' to rn' is marked off on the corresponding extended boundary lines starting from the respective centre points M1' and M2' to Mn' so that the sum of the radii ri and ri' is always equal to the centre distance for all of the corresponding arcs i and i', the boundary lines of arcs 1', 2' to n' and thus the corresponding arcs themselves are obtained.

It is recommendable to execute the method of generating the screw profiles by means of a computer. The measurements of the screw elements are then in a form in which they can be fed to a CNC (Computer Numerical Control) tool milling machine for producing the screw elements. The present invention therefore also relates to a computer program product with program code means for executing the method according to the invention for generating screw profiles according to the invention in a computer. In a preferred embodiment, the user of the computer program product preferably has a graphical user interface at his/her disposal, with the aid of which he/she can enter the parameters (the number of arcs of the generating and generated screw profile, the radii and the angles) to be selected. Preferably he/she is aided by instructions from the computer system if the selected parameter values would not produce pairs of screw profiles which wipe each other. On entering the parameter values he/she is preferably assisted by instructions concerning the permitted parameter value ranges. Permitted parameter values are understood to be such combinations of parameter values which produce pairs of wiping screw profiles.

In a preferred embodiment, not only the profiles but also entire screw elements are constructed virtually in a computer. The construction results are preferably fed to a computer screen or a printer in the form of construction drawings. It is also possible for the results to be supplied in the form of an electronic data file which, in a preferred embodiment, can be fed to a CAD milling machine for producing the corresponding screw elements.

After the profiles have been generated in the described manner the screw elements according to the invention can be produced using, for example, a milling machine, a lathe or a whirling machine. Preferred materials for producing the screw elements are steels, and in particular nitrated steels, chromium, tool and stainless steels, metallic composite materials produced by powder metallurgy and based on iron, nickel or cobalt and engineering ceramic materials such as for example zirconium oxide or silicon carbide.

The method according to the invention makes it possible to design the profile of a screw right from the beginning in such a manner that it is optimally suitable for a specified task. The screw elements known from the prior art are in most cases not optimally designed for a concrete task. On the contrary, manufacturers supply screw elements (conveying, kneading and mixing elements) from a set modular system independently of a concrete task. The present invention makes it possible for the first time to almost completely freely design the profiles of self-cleaning screw elements. It is thus possible to optimize the parameters of such profiles for the application concerned down to the most minute variation. In this connection it must be pointed out that there is no restriction on the number of arcs used for producing screw profiles. It is thus possible to approximate screw profiles which are not composed of arcs and are therefore not self-cleaning with the required precision by using a sufficiently high number of arcs. The profile approximated by means of arcs is of course self-cleaning.

It is also possible to calculate the longitudinal profile of a (generating or generated) screw profile. Preferably each arc of a screw profile is used for calculating that part of the longitudinal cross-section which belongs to this arc by means of an explicit function. In a first step the point of intersection (Sx, Sy) between a straight line g and an arc kb is determined. The straight line g is located in the plane of the screw profile and it leads through the point of rotation of the screw profile. The orientation of the straight line is given by the angle $\phi$.

Arc kb is characterized by its radius r and the position of its centre point (Mx, My). In a second step the distance s of the point of intersection (Sx, Sy) from the point of rotation of the screw profile is calculated. The point of intersection of a straight line with an arc can be calculated by an explicit function. The same applies to the calculation of the distance. The distance is therefore $s=s(\phi, r, Mx, My)$. Given a known pitch t of a screw element angle $\phi$ can be converted into an axial position z_ax by means of $\phi/2\pi*t$, so that the distance is $s=s(z\_ax, r, Mx, My)=s(\phi/2\pi*t, r, Mx, My)$. The function $s(z\_ax, r, Mx, My)$ defines the longitudinal profile of an arc of the screw profile.

BRIEF SUMMARY OF THE INVENTION

The invention is illustrated in more detail hereinbelow by means of the figures, without however being limited thereto.

FIG. 1 depicts a diagrammatic cross-section of an example of two corresponding arcs, FIG. 2 depicts the profiles of two-flight screw elements known according to the prior art, FIG. 3a, 3b depict diagrammatic cross-sections of a profile part X of the generating screw profile and a corresponding profile part Y of the generated screw profile of two-flight screw elements, FIG. 4 depicts diagrammatic cross-sections of screw elements FIG. 5 depicts diagrammatic cross-sections of screw elements according to the invention with mirror- and dot-symmetrical screw profiles FIG. 6 depicts diagrammatic cross-sections of profiles of two-flight screw elements known according to the prior art.

FIG. 7a-7b depict two corresponding profile parts X (of a generating screw profile) and Y (of a generated screw profile) of screw elements.).

FIG. 7c shows the x- and y-coordinates (Mx and My) of the centre points, the radii R and the angles α of the arcs for all of the arcs of FIG. 7a.

FIG. 9a-9b show two corresponding profile parts X (of the generating screw profile) and Y (of the generated screw profile) of screw elements.

FIG. 9c depicts the x- and y-coordinates (Mx and My) of the centre points, the radii R and the angles α of the arcs for all of the arcs in FIG. 9a.

DETAILED DESCRIPTION OF THE INVENTION

Figure 1:
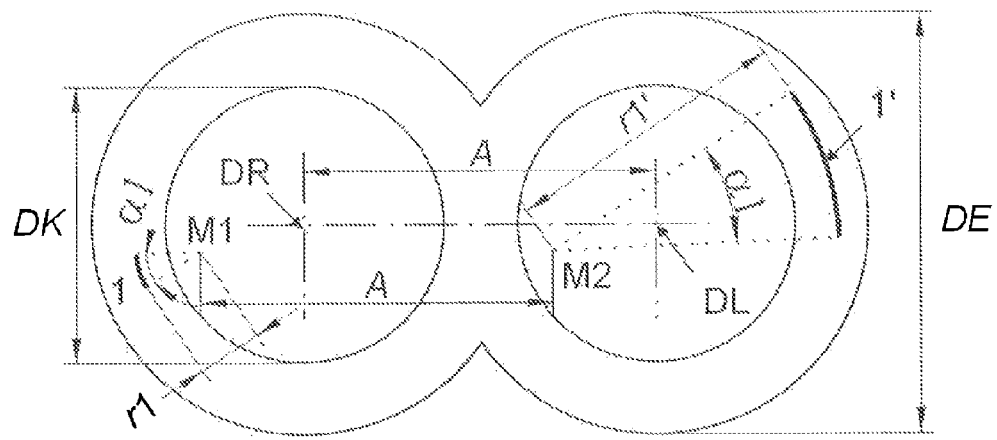

FIG. 1 depicts a diagrammatic cross-section of an example of two corresponding arcs of a generating and a generated screw profile. The centre of rotation of the generating screw profile is DR and the centre of rotation of the generated screw profile is DL. In this figure, arc 1 is a generating and arc 1' a generated arc. Arc 1 has a centre point M1, a radius r1 and an angle α1. Arc 1' has a centre point M1'=M2, a radius r1' and an angle α1', which is the same as α1 according to the invention. According to the invention, the sum of radii r1 and r1' equals the centre distance A. The connecting broken lines between the centre point M1 of arc 1 and its end points form the boundary lines of arc 1. They run parallel to the boundary lines of the corresponding arc 1', i.e. parallel to the connecting lines depicted in the form of broken lines between the centre point M1' of arc 1' and its end points.

The directions in which the end points of arc 1 lie in relation to the centre point M1 of arc 1 are in each case opposite the directions in which the end points of the corresponding arc 1' lie in relation to the centre point of arc 1'.

The distance between the centre point M1 of arc 1 and the centre point M1' of the corresponding arc 1' equals the centre distance.

The connecting line between the centre point M1 of arc 1 and the centre point M1' of the corresponding arc 1' runs parallel to the connecting line between the point of rotation DR and the point of rotation DL.

The direction in which the centre point M1 of arc 1 would have to be shifted in order to coincide with the centre point M1' of the corresponding arc 1' is the same as that in which the point of rotation DR would have to be shifted in order to coincide with the point of rotation DL.

Figure 2:
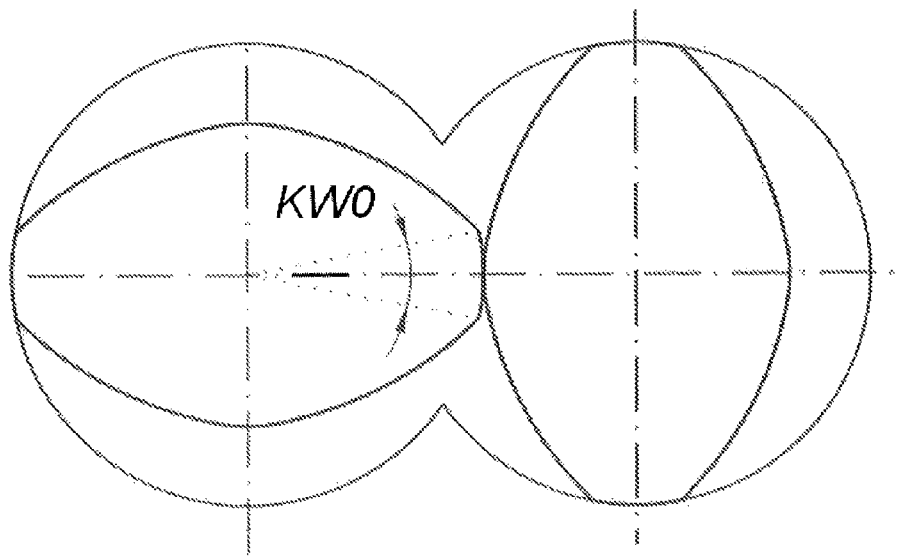

FIG. 2 depicts the profiles of two-flight screw elements known according to the prior art. The centre distance is 48 mm, the outer diameter of a screw profile is 58 mm, the inner diameter is 38 mm and the tip angle KW0, in terms of radian measurement, is 0.3788 (=21.7°). The sum of all of the tip angles SKW0, in terms of radian measurement, is 1.5152.

Figure 3A:
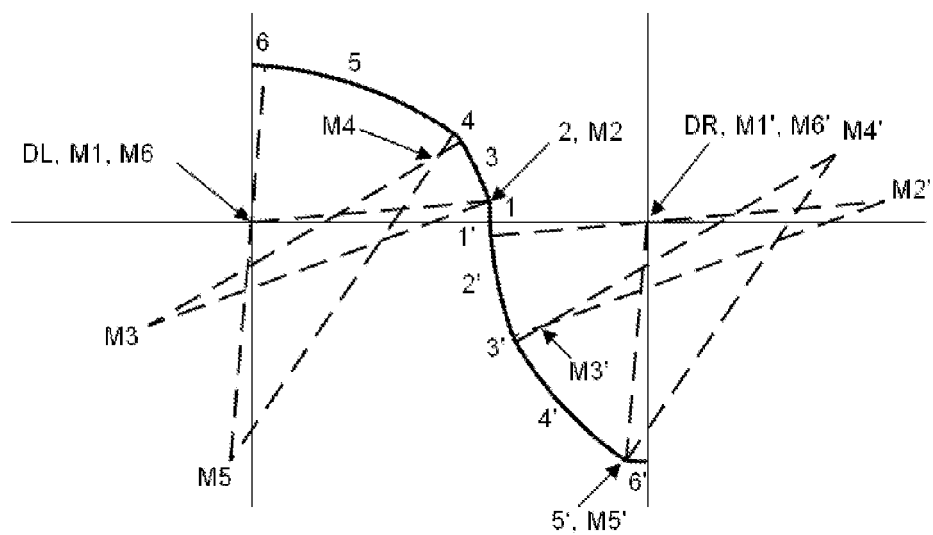
Figure 3B:
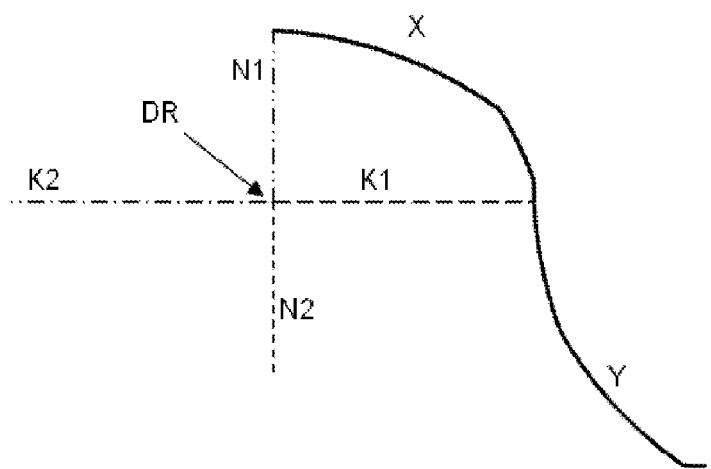

FIGS. 3a and 3b depict, by way of example, diagrammatic cross-sections of a profile part X of the generating screw profile and a corresponding profile part Y of the generated screw profile of two-flight screw elements according to the invention. Profile part X is formed by arcs 1, 2, 3, 4, 5 and 6. Profile part Y is formed by arcs 1', 2', 3', 4', 5' and 6' which correspond to the respective arcs of profile part X. The arcs are clearly defined by their respective centre points M1, M2, ..., M6 and M1', M2', ..., M6' and their respective angles and radii (see FIG. 3a).

In the present example the centre distance is 48 mm, the outer diameter of a screw profile is 58 mm and the inner diameter is 38 mm Arc 1 is the tip arc of the generating profile part and arc 6 is the root arc. Arc 2 has a radius of 0, i.e. the generating profile has a kink at its tip arc.

In FIG. 3b the labels of the arcs and the centre points have been removed in order to provide a better overview. Profile parts X and Y are identical to the profile parts shown in FIG. 3a.

Figure 4:
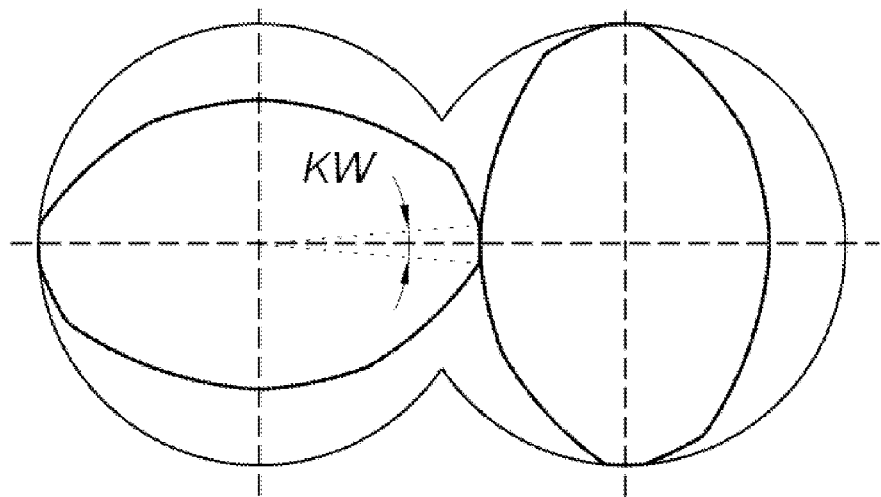

The overall profile of the two generating and generated screw profiles of the screw element can be obtained from the profile part X located between the adjacent lines K1 and N1 (see, for example, FIG. 4 and the text describing this figure). Line K1 is horizontal and line N1 vertical to the connecting line between the centres of rotation.

The following Table 1 depicts, in relation to a coordinate system whose origin is located at the point of rotation of the generating screw, whose x-axis is located in the direction of the point of rotation of the generated screw and whose y-axis is located vertically to the x-axis (i.e. in an upward direction in the figures), the radii of the arcs, the x and y coordinates of the centre points of the arcs, the starting angle of the arcs, the end angle of the arcs and the angle of the arcs for the arcs shown in FIGS. 3a and 3b. The starting angle of an arc is the angle of that boundary line of the arc which has the smaller value in a mathematically positive direction. For arcs in which the starting angle is greater than zero and the end angle is less than zero, the end angle is obtained by adding $2*\pi$.

TABLE 1

Geometrical measurements for profile parts X and Y of screw elements according to the invention, as depicted in FIGS. 3a and 3b.

| arc | radius mm | center point on the x-coordinate mm | center point on the y-coordinate mm | starting angle rad | end angle rad | angle rad |
|---|---|---|---|---|---|---|
| 1 | 29 | 0 | 0 | 0.00000 | 0.08727 | 0.08727 |
| 2 | 0 | 28.8896 | 2.52750 | 0.08727 | 0.34907 | 0.2618 |
| 3 | 44 | −12.4568 | −12.5214 | 0.34907 | 0.53093 | 0.18187 |
| 4 | 3 | 22.8989 | 8.2385 | 0.53093 | 0.97032 | 0.43939 |
| 5 | 48 | −2.5275 | −28.8896 | 0.97032 | 1.48353 | 0.51321 |
| 6 | 19 | 0 | 0 | 1.48353 | 1.5708 | 0.08727 |
| 1' | 19 | 48 | 0 | −3.14159 | −3.05433 | 0.08727 |
| 2' | 48 | 76.8896 | 2.5275 | −3.05433 | −2.79253 | 0.2618 |
| 3' | 4 | 35.5432 | −12.5214 | −2.79253 | −2.61066 | 0.18187 |
| 4' | 45 | 70.8989 | 8.2385 | −2.61066 | −2.17127 | 0.43939 |
| 5' | 0 | 45.4725 | −28.8896 | −2.17127 | −1.65806 | 0.51321 |
| 6' | 29 | 48 | 0 | −1.65806 | −1.5708 | 0.08727 |

FIG. 4 depicts diagrammatic cross-sections of screw elements according to the invention with a dot-symmetrical screw profile obtained from FIG. 3a or 3b by continuing to replicate the profile parts shown in FIG. 3a or 3b by the dot-symmetrical method. All of the tip angles are identical and equal to 0.17454 (10°). One tip angle KW is shown by way of example. The sum of all of the tip angles SKW is 0.698, i.e. less than half of that of the prior art element. This is a considerable advantage over the prior art. This screw profile also has the advantage that, where the screw is rotated in a clockwise direction, the pushing flank forms a considerably larger angle to the barrel than the pulling flank, which, in the case of partial filling, once again results in a considerably lower input of energy. It is also possible for the direction of rotation to be reversed, thereby producing increased elongation at the tip.

Figure 5:
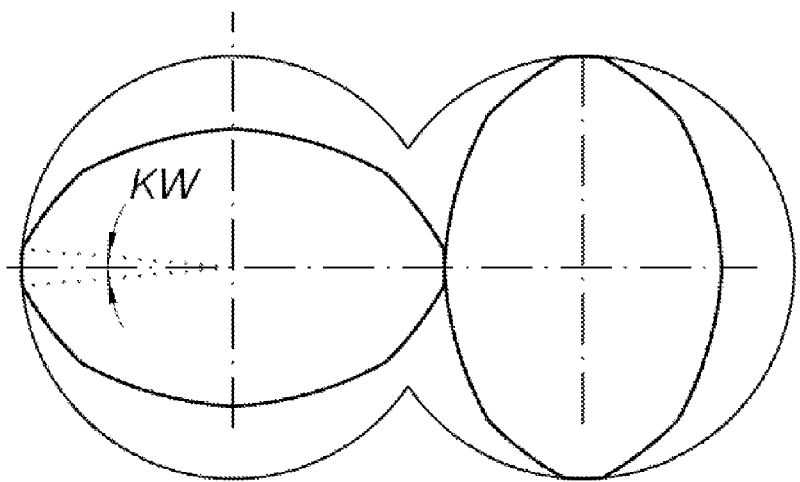

FIG. 5 depicts diagrammatic cross-sections of screw elements according to the invention with mirror- and dot-symmetrical screw profiles. In this example, the centre distance is 48 mm, the outer diameter of the screw profile is 58 mm, the inner diameter is 38 mm and each of the tip angles is 0.175 (10°). One tip angle KW is shown by way of example. The sum of all of the tip angles SKW is 0.69813, i.e. less than half the sum of the tip angles of the prior art element. The advantage lies in the lower dissipation of energy.

Figure 6:
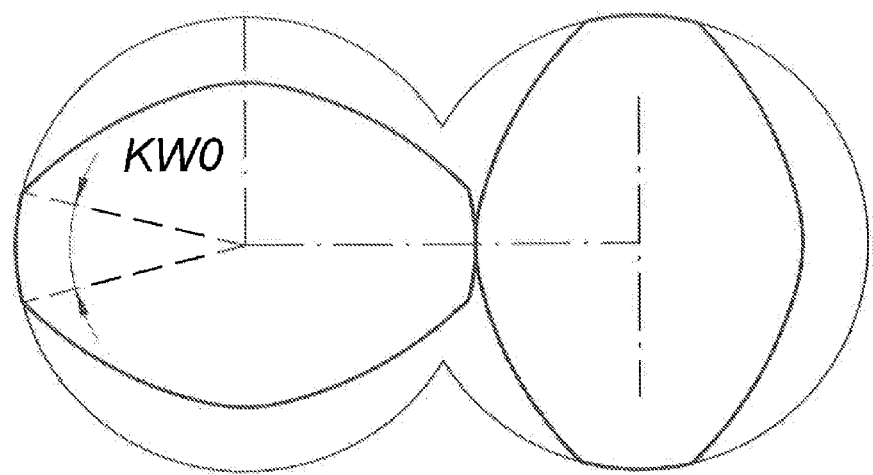

FIG. 6 depicts diagrammatic cross-sections of profiles of two-flight screw elements known according to the prior art. The centre distance is 48 mm, the outer diameter of a screw profile is 56 mm, the inner diameter is 40 mm and the tip angle KW0 is 0.4886. The sum SKW0 of all of the tip angles of both elements is 1.954. If this screw profile is compared to that of FIG. 2, the disadvantageous dependence according to the prior art of the tip angle on the ratio between the centre distance and the diameter according to equation 1 can be clearly identified.

Figure 7A:
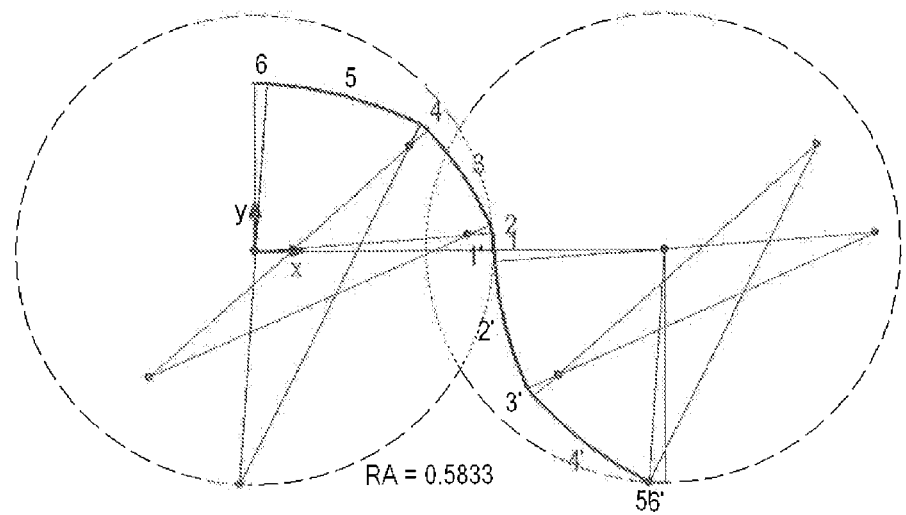
Figures 7B, 7C:
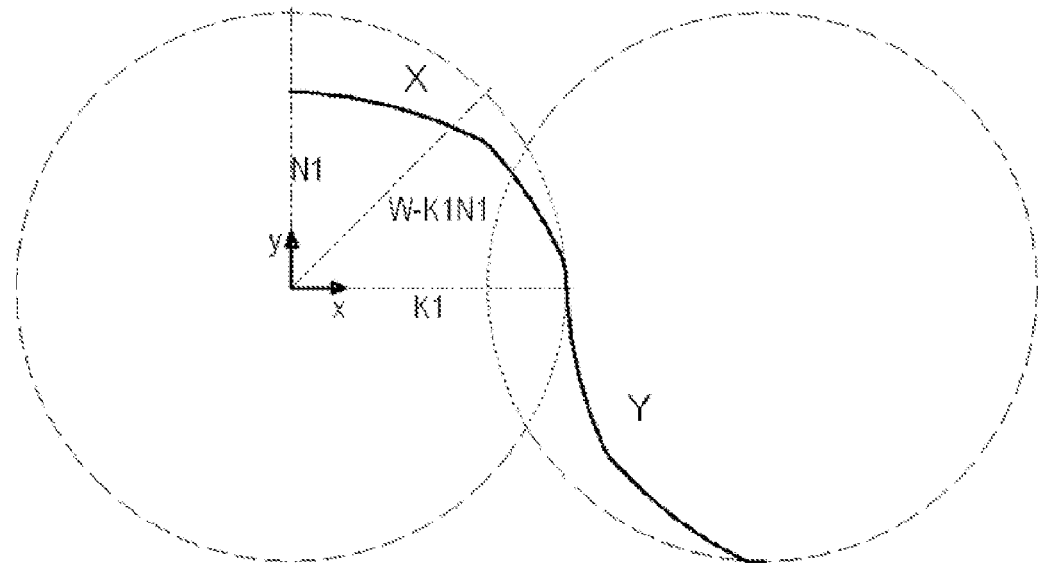

FIGS. 7a and 7b depict two corresponding profile parts X (of a generating screw profile) and Y (of a generated screw profile) of screw elements according to the invention. Profile part X is formed by arcs 1, 2, 3, 4, 5 and 6. Profile part Y is formed by the corresponding arcs 1', 2', 3', 4', 5' and 6'. The centre points of the arcs are depicted by small circles. The boundary lines of the arcs are depicted in the form of thin lines. In the present example, the centre distance is 48 mm, the outer diameter of a screw profile is 56 mm and the inner diameter is 40 mm Arc 1 is the tip arc and arc 6 is the root arc of the generating profile part. Arc 2, which follows on from the tip arc, has a radius of >0, i.e. the profile has no crest at this point, in contrast to the profile shown in FIGS. 3a and 3b. Arc 5', which is adjacent to tip angle 6', has a radius of 0, i.e. the generated profile has a kink at its tip arc. The centre point of arc 5' coincides with this kink. The "size of this kink" is determined by the corresponding angle, i.e. the transition from arc 4' to arc 6' is obtained by rotation about the angle of arc 5'. Or, in other words, a tangent on arc 4' at the centre point of arc 5' intersects a tangent on arc 6' also at the centre point of arc 5' and at an angle which corresponds to the angle of arc 5'. With the inclusion of arc 5', all adjacent arcs 4'→5', 5'→6' do however merge tangentially into each other in accordance with the invention.

The profile parts X and Y shown in FIG. 7b are identical to the profile parts shown in FIG. 7a. In FIG. 7b the labels of the arcs, the centre points and the boundary lines have been omitted in order to provide a better overview. Instead lines $K_1$ and $N_1$ are shown. Line $K_1$ is horizontal and line $N_1$ is vertical to a connecting line through the centres of rotation. The overall profile of the two generating and generated screw profiles of the screw element can be obtained from the profile part X located between the adjacent lines K1 and N1 (see, for example, FIG. 8 and the text describing this figure). FIG. 7c shows the x- and y-coordinates (Mx and My) of the centre points, the radii R and the angles α of the arcs for all of the arcs of FIG. 7a. The angles are defined in terms of radian measurement; all of the other geometrical values are normalized in relation to the centre distance and are therefore dimensionless.

The following Table 2 depicts, in relation to a coordinate system whose origin is located at the point of rotation of the generating screw, whose x-axis is located in the direction of the point of rotation of the generated screw and whose y-axis is located vertically to the x-axis (i.e. in an upward direction in the figures), the radii of the arcs, the x and y coordinates of the centre points of the arcs, the starting angle of the arcs, the end angle of the arcs and the angle of the arcs for FIGS. 7a and 7b.

TABLE 2

Geometrical measurements for the profile parts X and Y of screw elements according to the invention, as depicted in FIGS. 7a and 7b.

| arc | radius mm | center point on the x-coordinate mm | center point on the y-coordinate mm | starting angle rad | end angle rad | angle rad |
|---|---|---|---|---|---|---|
| 1 | 28 | 0 | 0 | 0 | 0.06981 | 0.06981 |
| 2 | 3 | 24.9391 | 1.7439 | 0.06981 | 0.41888 | 0.34907 |
| 3 | 44 | −12.5163 | −14.9323 | 0.41888 | 0.72856 | 0.30968 |
| 4 | 3 | 18.0752 | 12.3654 | 0.72856 | 1.10954 | 0.38098 |
| 5 | 48 | −1.9532 | −27.9318 | 1.10954 | 1.50098 | 0.39144 |
| 6 | 20 | 0 | 0 | 1.50098 | 1.5708 | 0.06981 |
| 1' | 20 | 48 | 0 | −3.14159 | −3.07178 | 0.06981 |
| 2' | 45 | 72.9391 | 1.7439 | −3.07178 | −2.72271 | 0.34907 |
| 3' | 4 | 35.4837 | −14.9323 | −2.72271 | −2.41303 | 0.30968 |
| 4' | 45 | 66.0752 | 12.3654 | −2.41303 | −2.03205 | 0.38098 |
| 5' | 0 | 46.0468 | −27.9318 | −2.03205 | −1.64061 | 0.39144 |
| 6' | 28 | 48 | 0 | −1.64061 | −1.5708 | 0.06981 |

Figure 8:
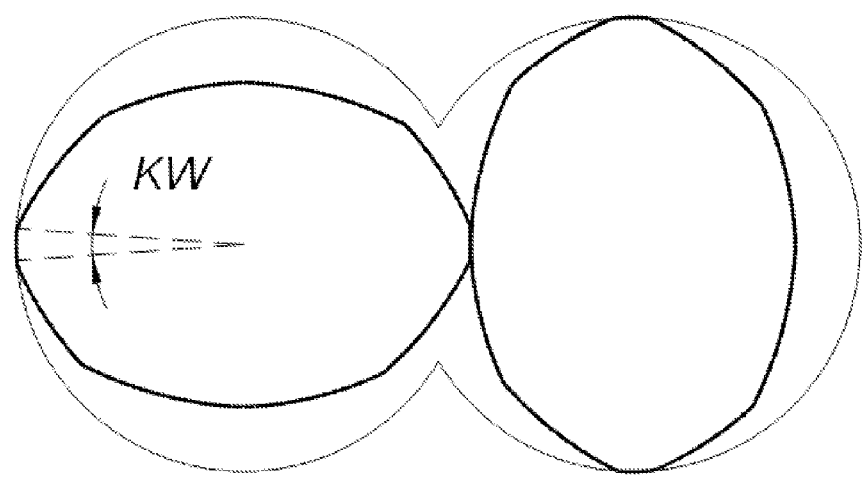
FIG. 8 depicts diagrammatic cross-sections of screw elements according to the invention with a dot-symmetrical screw profile obtained by continuing to replicate FIG. 7 by the dot-symmetrical method.

FIG. 8 depicts diagrammatic cross-sections of screw elements according to the invention with a dot-symmetrical screw profile obtained by continuing to replicate FIG. 7 by the dot-symmetrical method. In this example all of the tip angles are 0.14. One tip angle KW is shown by way of example. The sum SKW of all of the tip angles is 0.56. Using such a screw profile it is therefore possible to reduce the tip angle by a factor of about 3.5, thereby producing a considerably reduced input of energy. In addition—on rotating the screw in a counterclockwise direction—the crest of the pushing flank is rounded, thereby producing advantages from the point of view of wear.

Figure 9A:
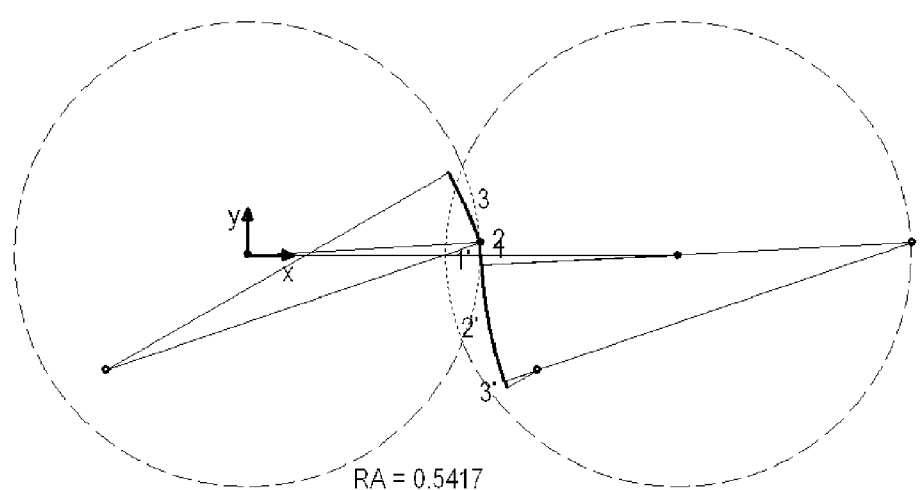
Figures 9B, 9C:
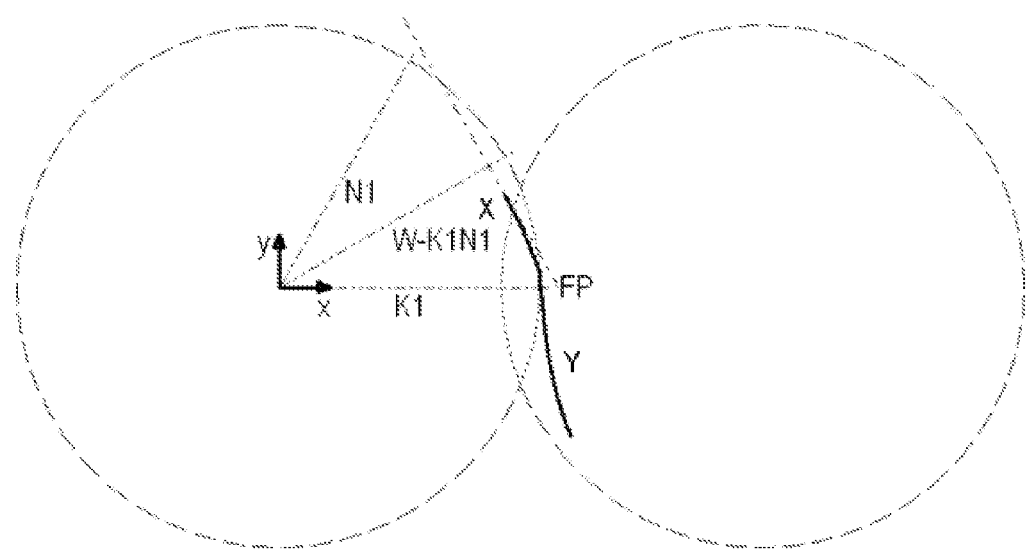

FIGS. 9a and 9b show two corresponding profile parts X (of the generating screw profile) and Y (of the generated screw profile) of screw elements according to the invention. The profile part X is formed by arcs 1, 2, and 3. Profile part Y is formed by the corresponding arcs 1', 2' and 3'. The centre points of the arcs are represented by small circles. The boundary lines of the arcs are depicted by thin lines. In this example the centre distance A is 48 mm, the diameter of the screw profile is 52 mm and the flight number Z is 3.

The profile parts X and Y shown in FIG. 9b are identical to the profile parts shown in FIG. 9a. In FIG. 9b the labels of the arcs, the centre points and the boundary lines have been omitted in order to provide a better overview. Instead, lines $K_1$ and $N_1$, the angle bisector $W-K_1/N_1$ and the straight line FP vertical to the angle bisector are shown. The straight line FP touches arc 3 at one of its end points and forms a tangent to arc 3 at this end point. Using profile part X the entire profile of a preferred embodiment of a symmetrical three-flight screw element can be constructed (see FIG. 10 and the text describing this figure).

FIG. 9c depicts the x- and y-coordinates (Mx and My) of the centre points, the radii R and the angles α of the arcs for all of the arcs in FIG. 9a. The angles are defined in terms of radian measurement; all of the other geometrical values are normalized in relation to the centre distance and are therefore dimensionless.

The following Table 3 depicts, in relation to a coordinate system whose origin is located at the point of rotation of the generating screw, whose x-axis is located in the direction of the point of rotation of the generated screw and whose y-axis is located vertically to the x-axis (i.e. in an upward direction in the figures), the radii of the arcs, the x and y coordinates of the centre points of the arcs, the starting angle of the arcs, the end angle of the arcs and the angle of the arcs for FIGS. 9a and 9b.

TABLE 3

Geometrical measurements for profile parts X and Y of screw elements according to the invention, as depicted in FIGS. 9a and 9b.

| arc | radius mm | center point on the x-coordinate mm | center point on the y-coordinate mm | starting angle rad | end angle rad | angle rad |
|---|---|---|---|---|---|---|
| 1 | 26 | 0 | 0 | 0 | 0.0524 | 0.0524 |
| 2 | 0 | 25.964 | 1.361 | 0.0524 | 0.3286 | 0.2762 |
| 3 | 44 | −15.681 | −12.839 | 0.3286 | 0.5236 | 0.1950 |
| 1' | 22 | 48 | 0 | −3.1416 | −3.0892 | 0.0524 |
| 2' | 48 | 73.964 | 1.361 | −3.0892 | −2.8130 | 0.2762 |
| 3' | 4 | 32.319 | −12.839 | −2.8130 | −2.6180 | 0.1950 |

Figure 10:
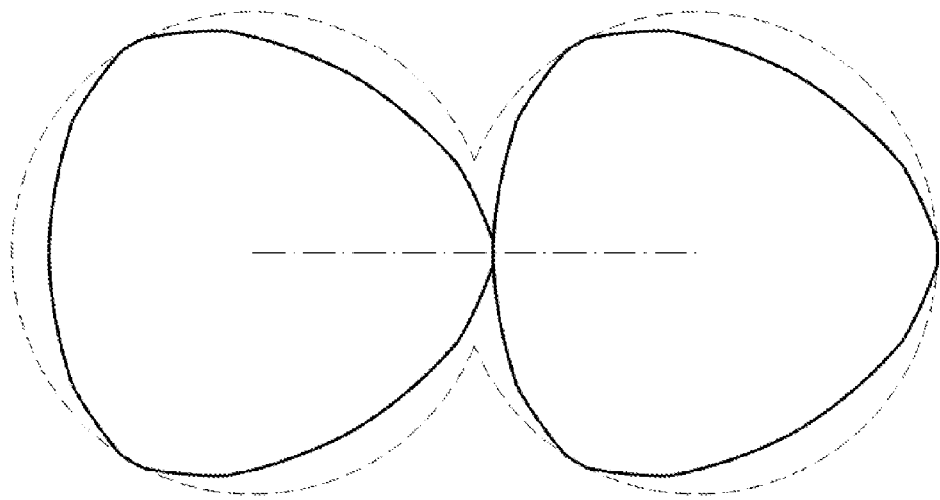
FIG. 10 depicts cross-sectional diagrams of screw elements.

FIG. 10 depicts cross-sectional diagrams of screw elements according to the invention with a mirror- and dot-symmetrical screw profile obtained by continuing to replicate the profile in FIG. 9a or 9b by the minor-symmetrical method. All of the tip angles are 0.1048 (6°), in contrast to a tip angle KW0 of 0.2576 in conventional screw elements.

Figure 11A:
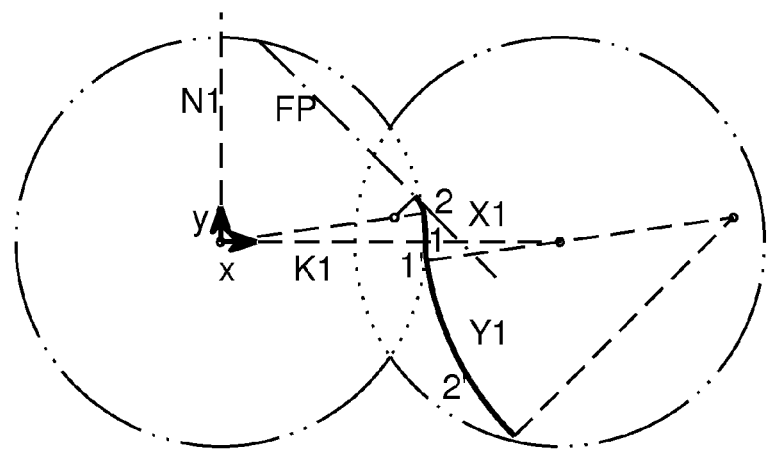
FIG. 11a depicts two corresponding profile parts X1 (of a generating screw profile) and Y1 (of a generated screw profile) of dot- and mirror-symmetrical screw elements.

FIG. 11a depicts, by way of example, two corresponding profile parts X1 (of a generating screw profile) and Y1 (of a generated screw profile) of dot- and mirror-symmetrical screw elements according to the invention. Profile part X1 is formed by arcs 1 and 2. Profile part Y1 is formed by the corresponding arcs 1' and 2'. Arcs 2 and 3 touch the straight line FP. This figure also shows the angles of the arcs in terms of radian measurement and the coordinates of the centre points of the arcs in a coordinate system whose origin is located at the point of rotation of the lefthand profile. The ratio between the outer radius and the centre distance is 0.6042.

Figure 11B:
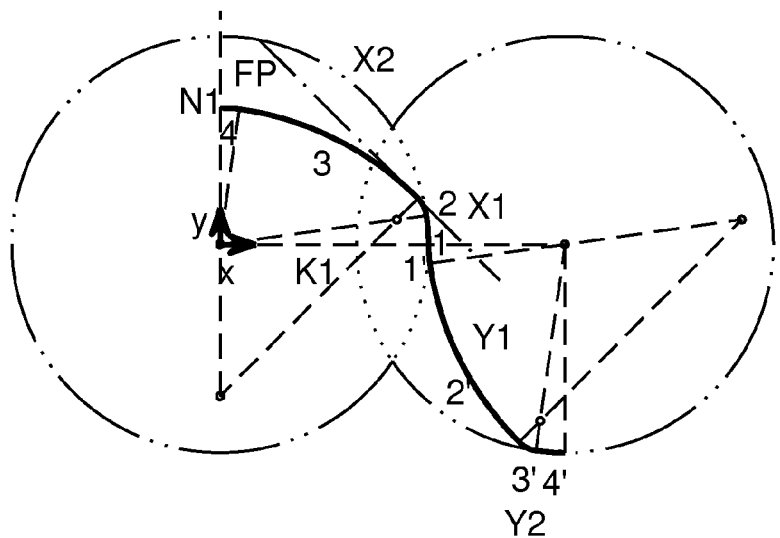
FIG. 11b shows how the profile of FIG. 11a can be continued to be replicated by mirroring about a vertical straight line midway between the points of rotation of the two screw.

FIG. 11b shows how the profile of FIG. 11a can be continued to be replicated by mirroring about a vertical straight line midway between the points of rotation of the two screw profiles, followed by rotation about the centre of rotation of the generated profile by π/Z. Using this method profile parts X2 and Y2 are obtained. The labelling of the arcs corresponds to that of FIG. 11a.

Figure 11C:
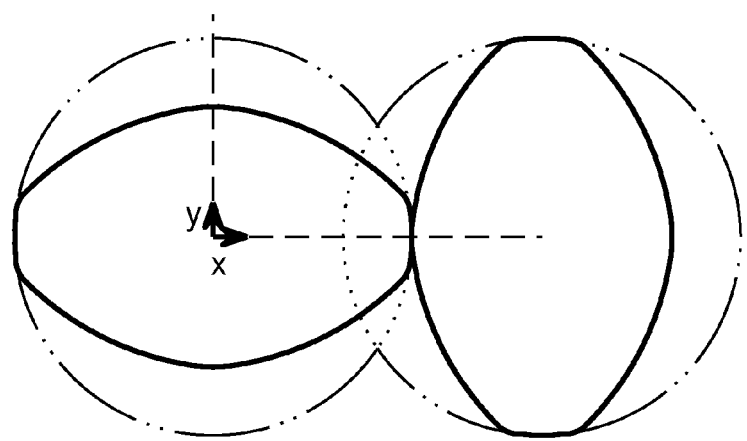
FIG. 11c shows the generating and generated screw profiles obtained by replicating the profile of profile 11b by rotation and mirroring.

FIG. 11c shows the generating and generated screw profiles obtained by replicating the profile of profile 11b by rotation and mirroring. The screw profiles thus obtained have tip angles of a size of 0.2795. Given such a ratio of outer radius to centre distance, a screw element according to the prior art would have a tip angle KW0 of 0.379. The sum SKW of all of the tip angles is accordingly 1.117, whereas the sum of all of the tip angles according to the prior art is 1.515. An overall profile in this figure is composed of a total of 12 arcs, i.e. the minimum number of arcs for a profile with Z=2.

Figure 12A:
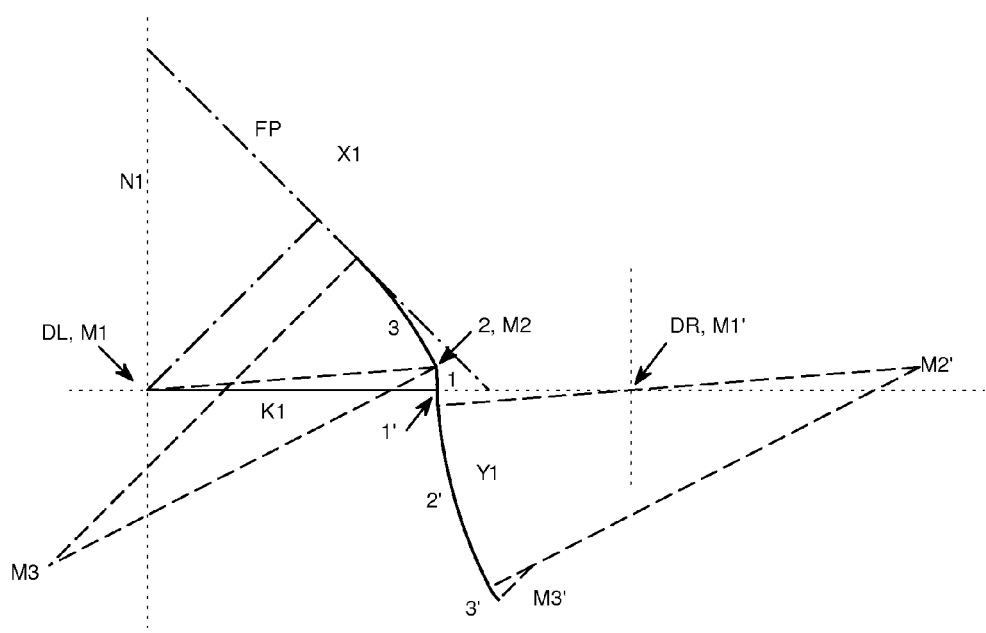
FIG. 12a shows two corresponding profile parts X1 (generating profile) and Y1 (generated profile) of dot- and mirror-symmetrical screw elements.

FIG. 12a shows two corresponding profile parts X1 (generating profile) und Y1 (generated profile) of dot- and mirror-symmetrical screw elements. Profile part X1 is defined by arcs 1, 2, and 3. Profile part Y1 is defined by the corresponding arcs 1', 2' und 3'. The distance between the points of rotation is normalized to 1. Arc 3 touches the line FP. In Table 4 the radii, angles, starting points of the arcs and center points of the arcs are listed.

TABLE 4

Figure 12B:
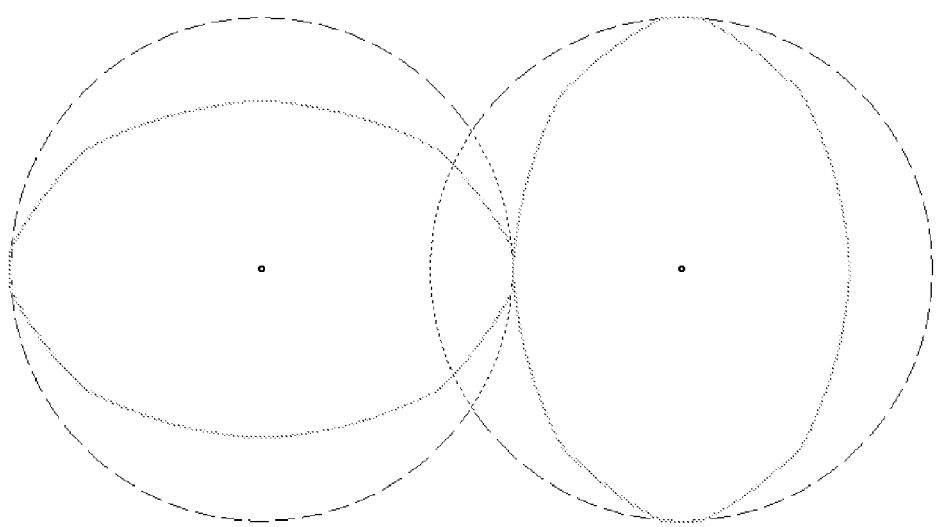
FIG. 12b shows the fully wiping profiles, which result from the profile parts depicted in FIG. 12a by mirroring and rotating.
Figure 12C:
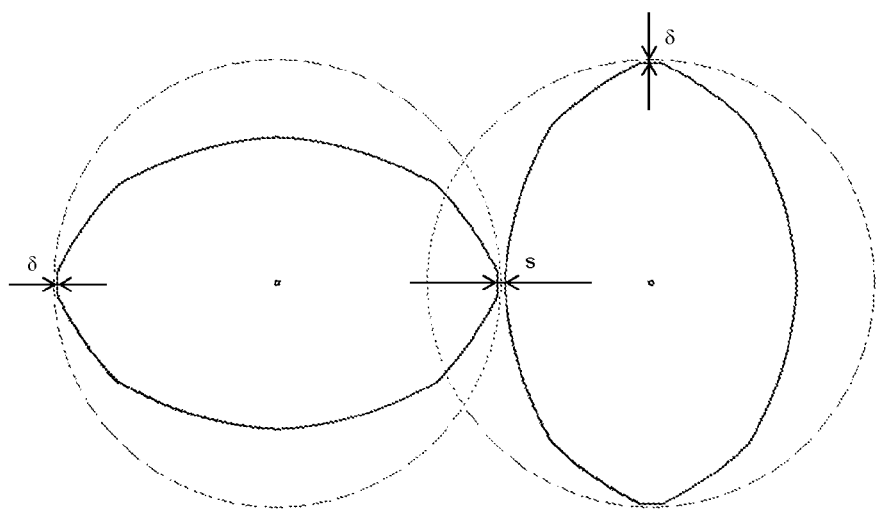
FIG. 12c shows two profiles which were constructed from the profiles depicted in FIG. 12b by using the method of three-dimensional equidistant clearance.

Geometrical measurements for profile parts X and Y of screw elements according to the invention, as depicted in FIGS. 12a, 12b, and 12c.

| radius | angle | starting point x-Koordinate | starting point y-coordinate | center point on the x-coordinate | center point on the x-coordinate |
|---|---|---|---|---|---|
| 0.6 | 0.0799 | 0.6 | 0 | 0 | 0 |
| 0 | 0.3943 | 0.5981 | 0.0479 | 0.5981 | 0.0479 |
| 0.9 | 0.3112 | 0.5981 | 0.0479 | −0.2026 | −0.3631 |

FIG. 12b shows the fully wiping profiles, which result from the profile parts depicted in FIG. 12a by mirroring and rotating. The tip angle KW of one profile is 0.1598. The sum of the tip angles of both profiles SKW is 0.3196. A profile being state of the art has got a tip angle KW0 of 0.399 and the sum of the tip angles of two corresponding profiles SKW0 is 0.799.

FIG. 12c shows two profiles which were constructed from the profiles depicted in FIG. 12b by using the method of three-dimensional equidistant clearance. The barrel diameter is 0.61, and clearance δ between barrel and screw and clearance s between screw and screw zwischen Schnecke is 0.02. The incline is 1.2.

The tip angle of one of the profiles is KWA=0.208. The sum of the tip angles of both profiles SKWA is 0.319.

Figure 12D:
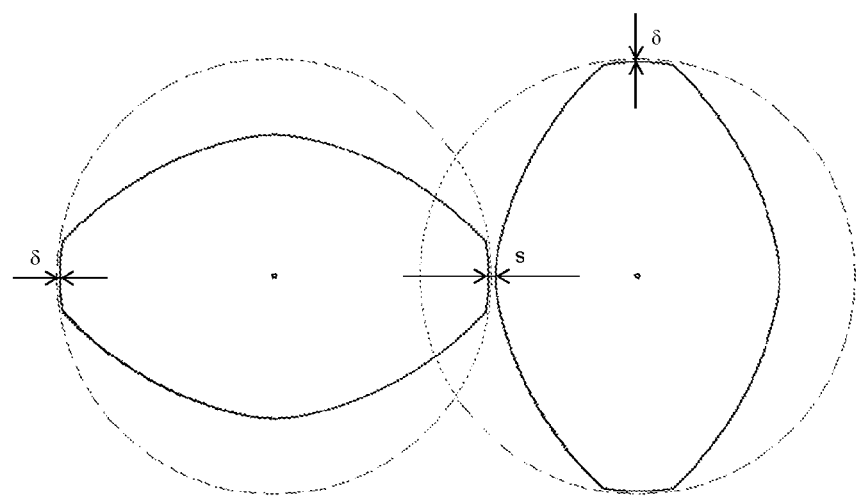
FIG. 12d shows profiles being state of the art, having identical clearances and an identical inline according to the profiles depicted in FIG. 12c.

FIG. 12d shows profiles being state of the art, having identical clearances and an identical inline according to the profiles depicted in FIG. 12c. One profile has got a tip angle KWA0 of 0.329; the sum of the tip angles of both profiles is 0.658.

The invention claimed is:

1. Screw elements for multiscrew extruders having a pair of barrels, the screw elements comprising
an intermeshing pair of screw elements, with paired co-rotating and fully wiping screw shafts, configured to be positioned within the pair of barrels, comprising a first screw element and a second screw element and having a number (Z) of screw flights indicative of a number of arcs of each screw element that are adapted to wipe an outer wall of each barrel when the intermeshing pair of screw elements are positioned within the pair of barrels, a centre distance (A) between the first screw element and the second screw element and an outer diameter (DE) of each screw element, wherein the number (Z) of screw flights for each screw element is at least two,
wherein the sum of tip angles of the intermeshing pair of screw elements is greater than 0 and smaller than $$2\pi - 4Z\arccos\left(\frac{A}{DE}\right),$$

wherein a clearance is provided between screw profiles of the intermeshing pair of screw elements,
wherein a generating screw profile of the first screw element and a generated screw profile of the second screw element each have a number of arcs, equal to 6*Z or more, with a radius larger than or equal to zero and smaller than or equal to the centre distance (A), and
further wherein the arcs merge tangentially into each other at their end points.

2. The screw elements according to claim 1, wherein an arc with the radius equal to zero is a sharp crest.

3. The screw elements according to claim 2, wherein each pair of corresponding arcs of the generated screw profile and the generating screw profile is characterized in that
angles of corresponding arcs are identical in size,
a sum of radii of corresponding arcs equals the centre distance (A),
each of connecting lines between a centre point of an arc of the generating screw profile and its end points is parallel to one connecting line between the centre point of the corresponding arc of the generated screw profile and its end points,
those directions in which the end points of an arc of the generating screw profile lie in relation to the centre point of said arc are in each case opposite those directions in which the end points of the corresponding arc of the generated screw profile lie in relation to the centre point of said arc of the generated screw profile,
the distance between the centre point of the arc of the generating screw profile and the centre point of the corresponding arc of the generated screw profile equals the centre distance,
the connecting line between the centre point of the arc of the generating screw profile and the centre point of the corresponding arc of the generated screw profile is parallel to the connecting line between the point of rotation of the generating screw profile and the point of rotation of the generated screw profile,
the direction in which the centre point of the arc of the generating screw profile would have to be shifted in order to coincide with the centre point of the corresponding arc of the generated screw profile is the same as that in which the point of rotation of the generating screw profile would have to be shifted in order to coincide with the point of rotation of the generated screw profile.

4. The screw elements according to claim 1, wherein at least one tip arc of the generating screw profile or the generated screw profile is followed by an arc with a radius of >0 and less than 0.1 times the outer diameter (DE) of each screw element.

5. The screw elements according to claim 1, wherein tip arcs and root arcs alternate with each other around the generating screw profile or the generated screw profile during rotation of the intermeshing pair of screw elements.

6. The screw elements according to claim 1, wherein the intermeshing pair of screw elements have a number of axes of symmetry which correspond to the number (Z) of screw flights.

7. The screw elements according to claim 1, wherein the intermeshing pair of screw elements have a point symmetry.

8. The screw elements according to claim 1, wherein the intermeshing pair of screw elements are conveying elements extending in an axial direction in a form of a screw.

9. The screw elements according to claim 1, wherein the intermeshing pair of screw elements are kneading elements extending in an axial direction in steps in a form of kneading discs.

10. The screw elements according to claim 1, wherein the intermeshing pair of screw elements are mixing elements having screw tips with openings.

11. A method of using screw elements comprising the steps of
providing an intermeshing pair of screw elements, with paired co-rotating and fully wiping screw shafts, comprising a first screw element and a second screw element and having a number (Z) of screw flights indicative of a number of arcs of each screw element that are adapted to wipe an outer wall of a barrel of a multi-screw extruder, a centre distance A between the first screw element and the second screw element and an outer diameter (DE) of each screw element, wherein the number (Z) of screw flights for each screw element is at least two,
wherein a sum of tip angles of the intermeshing pair of screw elements is greater than 0 and smaller than $$2\pi - 4Z\arccos\left(\frac{A}{DE}\right),$$

and
assembling the multi-screw extruder with the intermeshing pair of screw elements,
wherein a clearance is provided between screw profiles of the intermeshing pair of screw elements,
wherein a generating screw profile of the first screw element and the generated screw profile of the second screw element each have a number of arcs, equal to 6*Z or more, with a radius larger than or equal to zero and smaller than or equal to the centre distance (A), and
further wherein the arcs merge tangentially into each other at their end points.

12. A method of producing screw elements for a multi-screw extruder, having a pair of barrels, comprising the steps of
providing an intermeshing pair of screw elements, with paired co-rotating and fully wiping screw shafts, comprising a first screw element and a second screw element and having a number (Z) of screw flights indicative of a number of arcs of each screw element that are adapted to wipe an outer wall of each barrel when the intermeshing pair of screw elements are positioned within the pair of barrels, a centre distance A between the first screw element and the second screw element and an outer diameter (DE) of each screw element, wherein the number (Z) of screw flights for each screw element is at least two, generating screw profiles by juxtaposing, in each screw profile of the intermeshing pair of screw elements, a number of arcs, equal to 6*Z or more, with a radius larger than or equal to zero and smaller than or equal to the centre distance (A), wherein the arcs merge tangentially into each other at their end points, and wherein a sum of tip angles of the intermeshing pair of screw elements is greater than 0 and smaller than $$2\pi - 4Z\arccos\left(\frac{A}{DE}\right),$$

and further wherein a clearance is provided between screw profiles of the intermeshing pair of screw elements.

13. The screw elements according to claim 1, wherein a non-dimensional value of the clearance divided by the outer diameter (DE) of each screw element is from 0.001 to 0.1.

* * * * *